United States Patent
Chakkera et al.

(10) Patent No.: US 9,816,586 B2
(45) Date of Patent: Nov. 14, 2017

(54) LOCKING MANUAL DRIVE UNIT FOR AIRCRAFT ENGINE NACELLE DOOR OPERATING SYSTEM

(71) Applicant: HONEYWELL INTERNATIONAL INC., Morristown, NJ (US)

(72) Inventors: Kevin K Chakkera, Chandler, AZ (US); Timm E Hartman, Phoenix, AZ (US); Ron Vaughan, Gilbert, AZ (US); Stephen Birn, Long Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 301 days.

(21) Appl. No.: 14/803,305

(22) Filed: Jul. 20, 2015

(65) Prior Publication Data
US 2016/0312511 A1   Oct. 27, 2016

Related U.S. Application Data

(60) Provisional application No. 62/152,467, filed on Apr. 24, 2015.

(51) Int. Cl.
| | |
|---|---|
| *B64D 29/06* | (2006.01) |
| *F16H 1/20* | (2006.01) |
| *B64D 29/08* | (2006.01) |
| *F16H 25/24* | (2006.01) |
| *B64C 1/14* | (2006.01) |
| *F02K 1/76* | (2006.01) |
| *F16H 1/22* | (2006.01) |

(52) U.S. Cl.
CPC .......... *F16H 1/203* (2013.01); *B64C 1/1446* (2013.01); *B64D 29/06* (2013.01); *B64D 29/08* (2013.01); *F16H 25/2454* (2013.01); *F02K 1/763* (2013.01); *F16H 1/22* (2013.01)

(58) Field of Classification Search
CPC ........ B64D 27/26; B64D 29/06; B64D 29/08; F02K 1/763; F02K 1/766; E05Y 2900/502; B64C 1/1446; F16H 25/2454; F16H 2035/005; F16H 2048/282; F16H 2048/305; F16D 2127/06
USPC .................................. 74/347, 352, 378, 379
See application file for complete search history.

(56) References Cited

U.S. PATENT DOCUMENTS

| | | | | |
|---|---|---|---|---|
| 2,284,180 A | * | 5/1942 | Metcalf ................ | E05B 83/367 292/169 |
| 4,629,146 A | * | 12/1986 | Lymons ................ | B64D 29/06 180/69.2 |

(Continued)

*Primary Examiner* — Pascal M Bui Pho
*Assistant Examiner* — Marc Amar
(74) *Attorney, Agent, or Firm* — Lorenz & Kopf, LLP

(57) ABSTRACT

An aircraft engine nacelle door operating system locking manual drive unit includes a housing, an input drive shaft, an output drive shaft, a lock shaft, and a lock spring. The input drive shaft, the output drive shaft, and the lock shaft are all rotationally mounted in the housing. The output drive shaft continuously engages and mates with the input drive shaft, and he lock shaft extends at least partially into and engages the input drive shaft. The lock shaft is movable between a lock position, in which it engages and mates with the output drive shaft, and an unlock position, in it is disengaged from the output drive shaft. The lock spring supplies a bias force to the lock shaft that urges the lock shaft toward the lock position.

18 Claims, 3 Drawing Sheets

(56) References Cited

U.S. PATENT DOCUMENTS

| | | | | |
|---|---|---|---|---|
| 5,046,689 | A * | 9/1991 | Shine | B64D 29/08 244/129.4 |
| 6,094,908 | A | 8/2000 | Baudu et al. | |
| 6,487,846 | B1 * | 12/2002 | Chakkera | F02K 1/766 239/265.27 |
| 6,974,107 | B2 | 12/2005 | Christensen et al. | |
| 7,946,105 | B2 * | 5/2011 | Bristol | F02K 1/766 244/110 B |
| 2003/0066284 | A1 * | 4/2003 | Chakkera | F02K 1/766 60/226.2 |
| 2003/0192987 | A1 * | 10/2003 | Ahrendt | B64D 29/08 244/54 |
| 2010/0059634 | A1 * | 3/2010 | Vauchel | B64D 29/06 244/53 B |
| 2014/0230583 | A1 * | 8/2014 | Vaughan | F16H 25/2204 74/89.23 |
| 2015/0078879 | A1 | 3/2015 | Vaughan et al. | |
| 2016/0123275 | A1 * | 5/2016 | Arnaud | F02K 1/763 74/89.39 |

* cited by examiner

LOCKING MANUAL DRIVE UNIT FOR AIRCRAFT ENGINE NACELLE DOOR OPERATING SYSTEM

CROSS REFERENCE TO RELATED APPLICATIONS

This application claims the benefit of U.S. Provisional Application No. 62/152,467 filed Apr. 24, 2015.

TECHNICAL FIELD

The present invention generally relates to a manual drive unit, and more particularly relates to a locking manual drive unit for an aircraft engine nacelle door operating system.

BACKGROUND

The propulsion gas turbine engines installed on many aircraft are housed within a nacelle. Typically, the engine nacelle includes one or more cowl doors. The cowl doors may be moved between stowed (closed) and deployed (open) positions to allow maintenance personnel to access the interior of the nacelle to repair and maintain the engine.

The movement of the cowl doors between the stowed and deployed positions may be accomplished via hydraulic, pneumatic, or electric actuation systems. There may be times, however, that the cowl doors need to be moved when hydraulic, pneumatic, or electric power is unavailable. In such instances, the cowl doors need to be manually moved. To facilitate this, the actuation system may additionally include one or more manual drive units (MDUs). A typical, presently known MDU is configured to receive a specialized tool. An operator, by manually manipulating the tool, may move a cowl door to a desired position. The MDU is preferably provided with a locking mechanism capable of securing the cowl door in the desired position.

Although presently known MDUs are generally safe and reliable, these known MDUs may suffer one or more drawbacks. For example, if an operator applies excessive manual drive force, known MDUs can damage the cowl when impacting stops at the stowed and deployed positions. The locking mechanisms on known MDUs may not automatically engage, and some MDUs allow the specialized tool to remain in place even after it is no longer needed.

Hence, there is a need for a MDU that will not cause damage to the cowl when excessive drive force is applied and/or automatically engages the locking mechanism, and/or does not allow the specialized tool to remain in place after it is no longer needed. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft engine nacelle door operating system locking manual drive unit includes a housing, an input drive shaft, an output drive shaft, a lock shaft, and a lock spring. The input drive shaft is rotationally mounted in the housing, and includes a first end, a second end, an inner surface, and an input drive gear. The inner surface defines an axial bore between the first and second ends. The output drive shaft is rotationally mounted in the housing, and includes an output drive gear that continuously engages and mates with the input drive gear. The lock shaft is rotationally mounted in the housing and extends at least partially into the axial bore and engages the inner surface of the input drive shaft. The lock shaft includes a lock gear and is movable between a lock position, in which the lock gear engages and mates with the output drive gear, and an unlock position, in which the lock gear is disengaged from the output drive gear. The lock spring is mounted in the housing and engages the housing and the lock shaft. The lock spring supplies a bias force to the lock shaft that urges the lock shaft toward the lock position.

In another embodiment, a cowl door operating system includes a cowl door, an actuator, and a manual drive unit. The actuator is coupled to the cowl door and is coupled to receive a drive torque. The actuator is configured, upon receipt of the drive torque, to move the cowl door. The manual drive unit is coupled to the actuator and is configured to selectively supply the drive torque thereto. The manual drive unit includes a housing, an input drive shaft, an output drive shaft, a lock shaft, and a lock spring. The input drive shaft is rotationally mounted in the housing, and includes a first end, a second end, an inner surface, and an input drive gear. The inner surface defines an axial bore between the first and second ends. The output drive shaft is rotationally mounted in the housing, and includes an output drive gear that continuously engages and mates with the input drive gear. The lock shaft is rotationally mounted in the housing and extends at least partially into the axial bore and engages the inner surface of the input drive shaft. The lock shaft includes a lock gear and is movable between a lock position, in which the lock gear engages and mates with the output drive gear, and an unlock position, in which the lock gear is disengaged from the output drive gear. The lock spring is mounted in the housing and engages the housing and the lock shaft. The lock spring supplies a bias force to the lock shaft that urges the lock shaft toward the lock position.

In yet another embodiment, a gas turbine engine assembly includes a gas turbine engine, an engine nacelle, an actuator, and a manual drive unit. The engine nacelle has the gas turbine engine housed therein, and includes a cowl door. The actuator is coupled to the cowl door and is coupled to receive a drive torque. The actuator is configured, upon receipt of the drive torque, to move the cowl door. The manual drive unit is coupled to the actuator and is configured to selectively supply the drive torque thereto The manual drive unit includes a housing, an input drive shaft, an output drive shaft, a lock shaft, and a lock spring. The input drive shaft is rotationally mounted in the housing, and includes a first end, a second end, an inner surface, and an input drive gear. The inner surface defines an axial bore between the first and second ends. The output drive shaft is rotationally mounted in the housing, and includes an output drive gear that continuously engages and mates with the input drive gear. The lock shaft is rotationally mounted in the housing and extends at least partially into the axial bore and engages the inner surface of the input drive shaft. The lock shaft includes a lock gear and is movable between a lock position, in which the lock gear engages and mates with the output drive gear, and an unlock position, in which the lock gear is disengaged from the output drive gear. The lock spring is mounted in the housing and engages the housing and the lock shaft. The lock spring supplies a bias force to the lock shaft that urges the lock shaft toward the lock position.

Furthermore, other desirable features and characteristics of the manual drive unit will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. Thus, although embodiments are, for convenience, described herein as being implemented in cowl door operating system, it will be appreciated that the described embodiments may be used in various types of thrust reverser systems.

Figure 1:
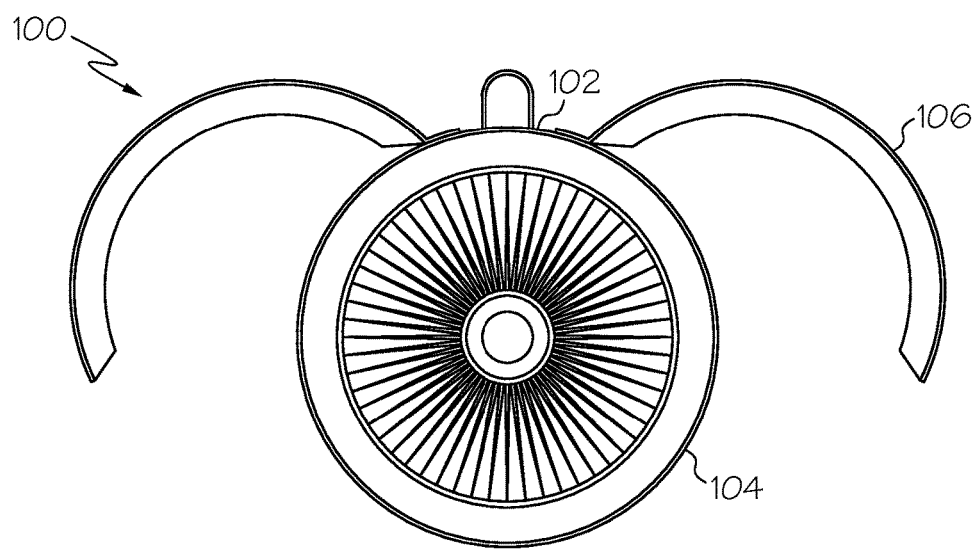
FIG. 1 depicts a front view of a jet engine with at least one set of cowl doors in an open position.

An engine 100, such as the gas turbine engine depicted in FIG. 1, includes at least a fan section and a turbine section that are housed within an engine nacelle 102. The nacelle 102 includes one or more sets of cowl doors that may be opened to provide access to various portions of the engine. For example, the nacelle 102 may include fan cowl doors 104 (shown in the closed position), one on each side of the engine nacelle 102, that may be opened to provide access to the engine fan section, and engine cowl doors 106 (shown in the opened position), one on each side of the engine nacelle 102, that may be opened to provide access to the turbine engine section. It will be appreciated that the engine 100, depending upon its configuration, may include additional cowl doors beyond those explicitly depicted and described. Moreover, the engine 100 may be equipped, in some embodiments, with a single cowl that translates aft, rather than rotates.

Figure 2:
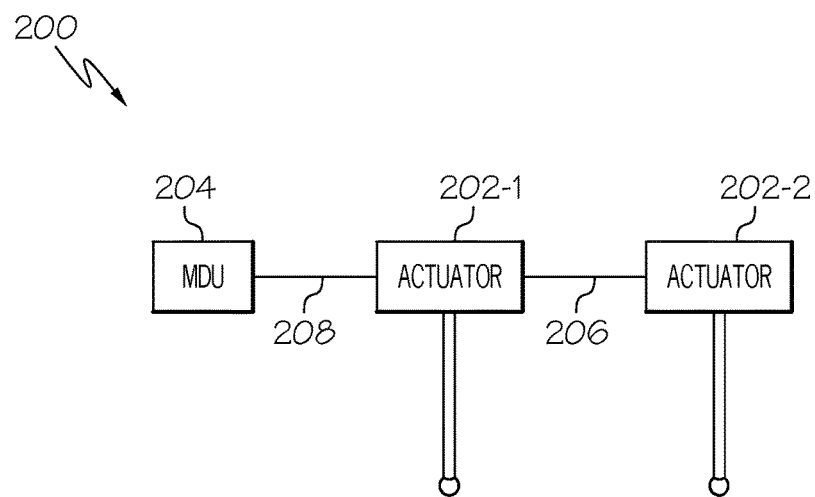
FIG. 2 depicts simplified functional schematic diagram of one embodiment of a cowl door operating system.

The cowl doors 104 and 106 are each moved between the open and close positions using a cowl door operating system 200. A representation of an exemplary embodiment of a system 200 associated with a single cowl door 106 is depicted in FIG. 2. The depicted system 200 includes a plurality of actuator assemblies 202 (202-1, 202-2) and a manual drive unit (MDU) 204. The actuator assemblies 202 are coupled to one or more of the cowl doors 104, 106, and are interconnected via an inter-actuator drive shaft 206, such as a flexible shaft. It will be appreciated that the actuator assemblies 202 may be implemented using any one of numerous known types of actuator assemblies, but in the depicted embodiment are implemented using ball screw actuator assemblies. It will additionally be appreciated that although the depicted system 200 includes two actuator assemblies 202, the system 200 may be implemented with more or less than this number.

The MDU 204 is coupled to the actuator assemblies 202 via a second drive shaft 208, such as second flexible drive shaft 208. The MDU 204, as is generally known, allows the manual actuation of one or more cowl doors 104, 106 during routine maintenance. In particular, a drive tool may be interfaced with the MDU 204 to allow an operator to manually drive the cowl door 104, 106 to a desired position. The depicted MDU 204 is additionally configured to automatically lock the cowl door 104, 106 in the desired position, eject the interface tool, and not cause damage to the cowl when excessive drive force is applied. A particular embodiment of the MDU 204 is depicted in FIGS. 3 and 4, and with reference thereto will now be described.

The depicted MDU 204 includes a housing 302, an input drive shaft 304, an output drive shaft 306, and a lock shaft 308. The input drive shaft 304 is rotationally mounted within the housing 302 via, for example, a duplex bearing set 312, and includes a first end 314, a second end 316, an inner surface 318 that defines an axial bore 322 between the first and second ends 314, 316, and an input drive gear 324. The first end 314 is adapted to receive a manual drive tool. More specifically, the drive tool (not depicted) may be inserted, at the first end 314, into the axial bore 322 and, as will be described further below, engage the lock shaft 308. The drive tool also engages the inner surface 318 of the input drive shaft 304 to impart a drive torque thereto.

The output drive shaft 306 is rotationally mounted in the housing 302 via, for example, a bearing assembly 331, and includes a first end 326, a second end 328, and an output drive gear 332. The output drive gear 332 extends outwardly from the output drive shaft, and continuously engages and mates with the input drive gear 324, which extends outwardly from the input drive shaft 302. Thus, when the input drive shaft 304 is rotated, it imparts a drive torque to the output drive shaft 306. Although the input drive gear 324 and the output drive gear 332 may be variously configured and implemented, in the depicted embodiment these gears 324, 332 are bevel gears.

Figure 3:
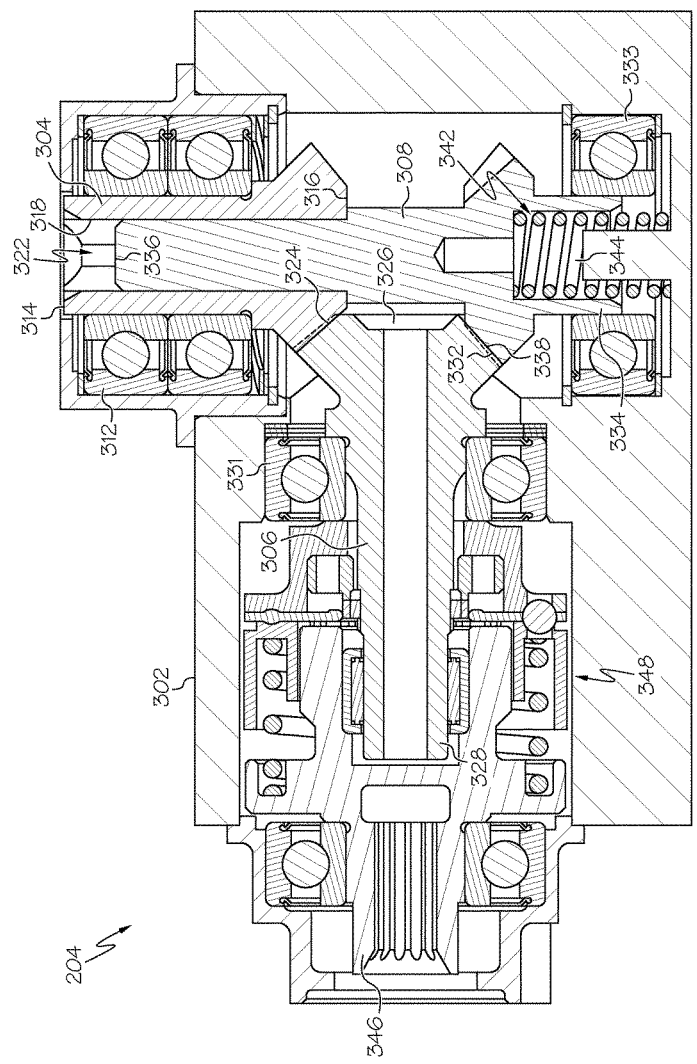
FIG. 3 depicts a cross section view of an embodiment of a manual drive unit (MDU) that may be used in the system depicted in FIG. 2, with the MDU in a lock position.
Figure 4:
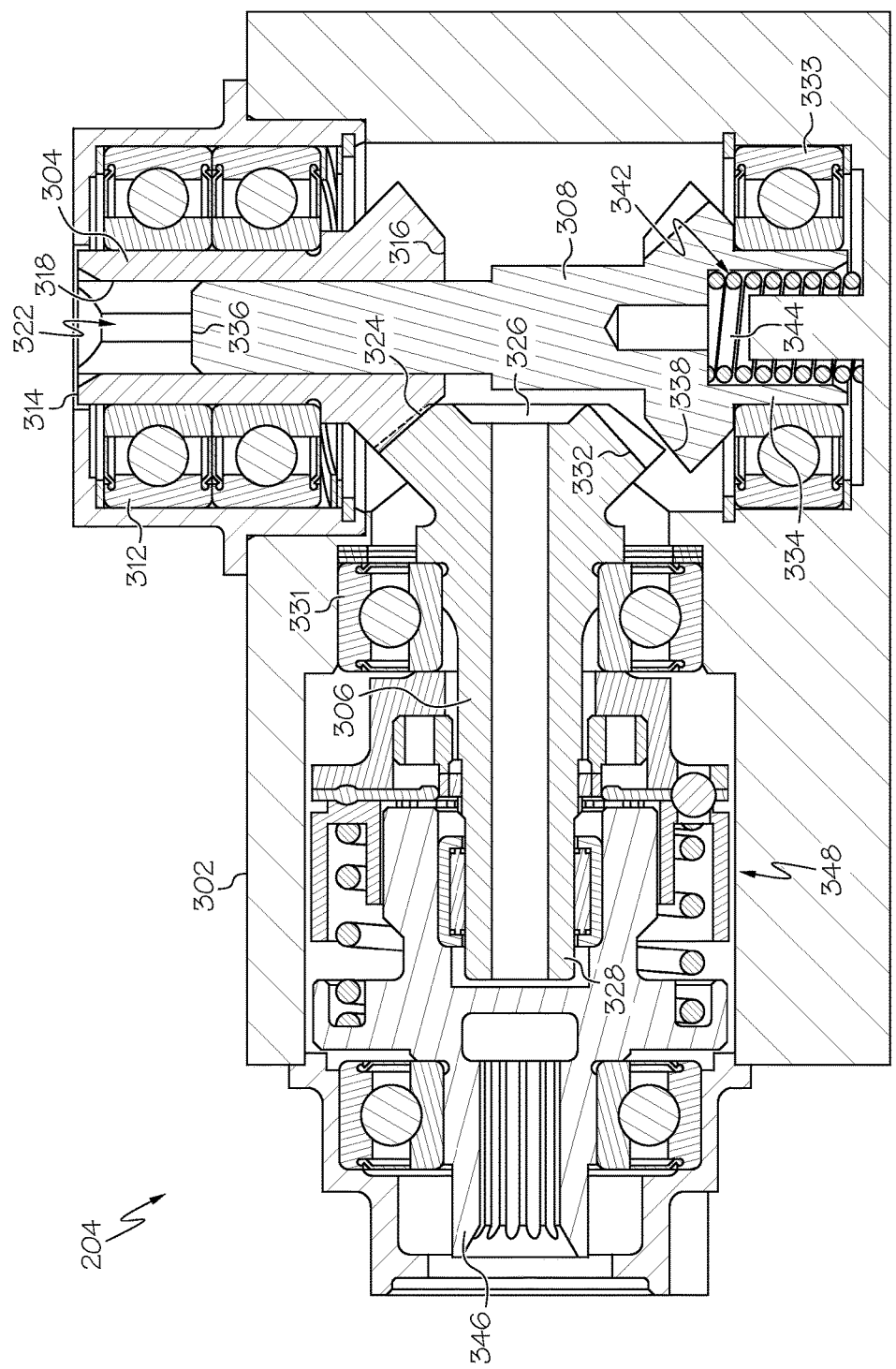
FIG. 4 depicts the MDU of FIG. 3 in an unlock position.

The lock shaft 308 is rotationally mounted in the housing 302 via, for example, a second bearing assembly 333, and is movable between a lock position, which is the position depicted in FIG. 3, and an unlock position, which is the position depicted in FIG. 4. The lock shaft 308 includes a first end 334, a second end 336, and a lock gear 338. The first end 334 has a spring cavity 342 formed therein. A lock spring 344 is disposed within the spring cavity 342 and engages a portion of the housing 302. The lock spring 344 is configured to supply a bias force to the lock shaft 308 that urges the lock shaft 308 toward the lock position. In the transition between the unlock position depicted in FIG. 4 and the lock position depicted in FIG. 3, positive gear meshing, which provides the locking of the output drive gear 332 and the lock gear 338, is provided by means of indexing the second end 336 of the lock shaft 308 within the axial bore 322 of the input drive shaft 304. In this embodiment it is shown as the same square drive used by the operator to manually drive the actuators open and closed. The bias force supplied to the lock shaft 308 also urges the drive tool, when it is inserted into the axial bore 322, to be ejected from the MDU 204.

The lock shaft 308 extends into the axial bore 322 and engages the inner surface 318 of the input drive shaft 304. Thus, when the lock shaft 308 is in the unlock position (FIG. 4), it will rotate with the input drive shaft 304. The lock gear 338 engages the output drive gear 332 when the lock shaft 308 is in the lock position (FIG. 3), and is disengaged from the output drive gear 332 when the lock shaft 308 is in the unlock position (FIG. 4).

As FIG. 3 also depicts, the MDU additionally includes a flexible shaft interface 346 and a torque limiter 348. The flexible shaft interface 346 surrounds a portion of the output drive shaft 306 and is coupled to the output drive shaft 306 via the torque limiter 348. The flexible shaft interface 346 is configured to be coupled to, for example, the second flexible shaft 208. The torque limiter 348 is configured to limit the torque that is transmitted from the MDU to the actuator assemblies 202 and the cowl doors 104, 106. Although the torque limiter may be variously configured and implemented, in the depicted embodiment it is implemented using a well-known ball ramp torque limiter.

With the above-described MDU 204 configuration, when a drive tool is inserted into the axial bore 322 at the first end 314 of the input drive shaft 304, and the operator supplies sufficient force to overcome the bias force of the lock spring 344, the lock shaft 308 translates into the unlock position. As a result, the lock gear 338 disengages from the output gear 332. Thereafter, when an operator rotates the drive tool, and thus rotates the input drive shaft 304, a torque is imparted to the output shaft 306, to thereby move the cowl door 104, 106, via the actuator assemblies 202.

When the cowl door 104, 106 is moved to the desired position, the operator will stop rotating the drive tool and remove the force on the second end 336 of the lock shaft 308. The bias force of the lock spring 344 will translate the lock shaft 308 back into the lock position, in which the lock gear 338 again engages and mates with the output gear 332. It is further noted that the bias force of the lock spring 344 will simultaneously cause the drive tool to be ejected from the input drive shaft 304, ensuring that it cannot be left in place after operation. Because, as noted above, the lock shaft 308 engages the input drive shaft 304, when the lock gear 338 engages and mates with the output gear 332, the output drive shaft 306 is locked in place and prevented from further rotation. This is because attempting to drive the input drive shaft 304 in one direction will result the lock shaft 308 trying to rotate in the opposite direction.

The MDU 204 depicted and described herein automatically locks a cowl door 104, 106 in a desired position, ejects the drive tool, and does not cause damage to the cowl when excessive drive force is applied.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:

1. An aircraft engine nacelle door operating system locking manual drive unit, the manual drive unit comprising:
   a housing;
   an input drive shaft rotationally mounted in the housing, the input drive shaft including a first end, a second end, an inner surface, and an input drive gear, the inner surface defining an axial bore between the first and second ends;
   an output drive shaft rotationally mounted in the housing, the output drive shaft including an output drive gear that continuously engages and mates with the input drive gear;
   a lock shaft rotationally mounted in the housing and extending at least partially into the axial bore and engaging the inner surface of the input drive shaft, the lock shaft including a lock gear and movable between a lock position, in which the lock gear engages and mates with the output drive gear, and an unlock position, in which the lock gear is disengaged from the output drive gear; and
   a lock spring mounted in the housing and engaging the housing and the lock shaft, the lock spring supplying a bias force to the lock shaft that urges the lock shaft toward the lock position.

2. The manual drive unit of claim 1, wherein the input drive shaft and the lock shaft are configured such that the lock shaft is indexed to the input drive shaft within the axial bore.

3. The manual drive unit of claim 1, wherein:
   the axial bore of the input drive shaft is configured to receive a manual operating tool therein;
   the lock shaft is configured to be engaged by the manual operating tool, when the manual operating tool is inserted into the axial bore; and
   the bias force supplied by the lock spring to the lock shaft additionally urges the manual drive tool, when the manual operating tool is inserted into the axial bore, to be ejected from the axial bore.

4. The manual drive unit of claim 1, further comprising:
   a flexible shaft interface coupled to, and surrounding a portion of, the output drive shaft.

5. The manual drive unit of claim 1, further comprising:
   a torque limiter coupled to the flexible shaft interface and the output drive shaft.

6. The manual drive unit of claim 1, wherein the input drive gear, the output drive gear, and the lock gear are each bevel gears.

7. A cowl door operating system, comprising:
a cowl door;
an actuator coupled to the cowl door and coupled to receive a drive torque, the actuator configured, upon receipt of the drive torque, to move the cowl door; and
a manual drive unit coupled to the actuator and configured to selectively supply the drive torque thereto, the manual drive unit comprising:
a housing;
an input drive shaft rotationally mounted in the housing, the input drive shaft including a first end, a second end, an inner surface, and an input drive gear, the inner surface defining an axial bore between the first and second ends;
an output drive shaft rotationally mounted in the housing, the output drive shaft including an output drive gear that continuously engages and mates with the input drive gear;
a lock shaft rotationally mounted in the housing and extending at least partially into the axial bore and engaging the inner surface of the input drive shaft, the lock shaft including a lock gear and movable between a lock position, in which the lock gear engages and mates with the output drive gear, and an unlock position, in which the lock gear is disengaged from the output drive gear; and
a lock spring mounted in the housing and engaging the housing and the lock shaft, the lock spring supplying a bias force to the lock shaft that urges the lock shaft toward the lock position.

8. The system of claim 7, wherein the input drive shaft and the lock shaft are configured such that the lock shaft is indexed to the input drive shaft within the axial bore.

9. The system of claim 7, wherein:
the axial bore of the input drive shaft is configured to receive a manual operating tool therein;
the lock shaft is configured to be engaged by the manual operating tool, when the manual operating tool is inserted into the axial bore; and
the bias force supplied by the lock spring to the lock shaft additionally urges the manual drive tool, when the manual operating tool is inserted into the axial bore, to be ejected from the axial bore.

10. The system of claim 7, further comprising:
a flexible shaft interface coupled to, and surrounding a portion of, the output drive shaft.

11. The system of claim 7, further comprising:
a torque limiter coupled to the flexible shaft interface and the output drive shaft.

12. The system of claim 7, wherein the input drive gear, the output drive gear, and the lock gear are each bevel gears.

13. A gas turbine engine assembly, comprising:
a gas turbine engine;
an engine nacelle having the gas turbine engine housed therein, the engine nacelle including a cowl door;
an actuator coupled to the cowl door and coupled to receive a drive torque, the actuator configured, upon receipt of the drive torque, to move the cowl door; and
a manual drive unit coupled to the actuator and configured to selectively supply the drive torque thereto, the manual drive unit comprising:
a housing;
an input drive shaft rotationally mounted in the housing, the input drive shaft including a first end, a second end, an inner surface, and an input drive gear, the inner surface defining an axial bore between the first and second ends;
an output drive shaft rotationally mounted in the housing, the output drive shaft including an output drive gear that continuously engages and mates with the input drive gear;
a lock shaft rotationally mounted in the housing and extending at least partially into the axial bore and engaging the inner surface of the input drive shaft, the lock shaft including a lock gear and movable between a lock position, in which the lock gear engages and mates with the output drive gear, and an unlock position, in which the lock gear is disengaged from the output drive gear; and
a lock spring mounted in the housing and engaging the housing and the lock shaft, the lock spring supplying a bias force to the lock shaft that urges the lock shaft toward the lock position.

14. The assembly of claim 13, wherein the input drive shaft and the lock shaft are configured such that the lock shaft is indexed to the input drive shaft within the axial bore.

15. The assembly of claim 13, wherein:
the axial bore of the input drive shaft is configured to receive a manual operating tool therein;
the lock shaft is configured to be engaged by the manual operating tool, when the manual operating tool is inserted into the axial bore; and
the bias force supplied by the lock spring to the lock shaft additionally urges the manual drive tool, when the manual operating tool is inserted into the axial bore, to be ejected from the axial bore.

16. The assembly of claim 13, further comprising:
a flexible shaft interface coupled to, and surrounding a portion of, the output drive shaft.

17. The assembly of claim 13, further comprising:
a torque limiter coupled to the flexible shaft interface and the output drive shaft.

18. The assembly of claim 13, wherein the input drive gear, the output drive gear, and the lock gear are each bevel gears.

* * * * *